(12) United States Patent  
Vermeersch et al.

(10) Patent No.: US 8,197,387 B2
(45) Date of Patent: Jun. 12, 2012

(54) SHIFT LEVER ASSEMBLY HAVING A DUAL SIGNAL PARK POSITION SWITCH

(75) Inventors: Michael C. Vermeersch, Saginaw, MI (US); Larry W. Burr, Saginaw, MI (US)

(73) Assignee: Steering Solutions IP Holding Corporation, Saginaw, MI (US)

( * ) Notice: Subject to any disclaimer, the term of this patent is extended or adjusted under 35 U.S.C. 154(b) by 1134 days.

(21) Appl. No.: 12/042,473

(22) Filed: Mar. 5, 2008

(65) Prior Publication Data

US 2009/0223316 A1 Sep. 10, 2009

(51) Int. Cl.
*F16H 59/74* (2006.01)
*B60K 20/00* (2006.01)
(52) U.S. Cl. ............... 477/99; 74/473.21; 74/473.25
(58) Field of Classification Search ............ 477/94, 477/96, 99; 74/473.21, 473.25
See application file for complete search history.

(56) References Cited

U.S. PATENT DOCUMENTS

| | | | |
|---|---|---|---|
| 5,860,303 A | 1/1999 | Droz et al. | |
| 5,938,562 A | 8/1999 | Withey | |
| 6,592,492 B1 | 7/2003 | Kalia | |
| 6,783,480 B2 * | 8/2004 | Masuda et al. | 477/94 |
| 6,817,966 B2 | 11/2004 | Avers et al. | |
| 6,879,480 B2 | 4/2005 | Kalia | |
| 6,945,377 B2 | 9/2005 | Burr et al. | |
| 7,189,186 B2 | 3/2007 | Weber et al. | |
| 7,270,623 B2 * | 9/2007 | Wang | 477/96 |
| 7,597,649 B2 * | 10/2009 | Wang | 477/99 |

* cited by examiner

*Primary Examiner* — Edwin A Young
(74) *Attorney, Agent, or Firm* — Cantor Colburn LLP (57) ABSTRACT

A shift lever assembly utilizing a single switch to produce a first signal indicating that a transmission of a vehicle is in a park position and a second signal to authorize removal of a key from an ignition of the vehicle is disclosed. The switch includes a casing supporting a plunger having a first park indication contact and a first key removal contact. The casing includes a second park indication contact and a second key removal contact. The first park indication contact engages the second park indication contact when the plunger is in a rest position and is disengaged from the second park indication contact when the plunger is in a depressed position. The first key removal contact is disengaged from the second key removal contact when the plunger is in the rest position and engages the second key removal contact when the plunger is in the depressed position.

21 Claims, 8 Drawing Sheets

FIG - 8

SHIFT LEVER ASSEMBLY HAVING A DUAL SIGNAL PARK POSITION SWITCH

BACKGROUND OF THE INVENTION

1. Field of the Invention

The subject invention relates to a shift lever assembly for actuating a transmission of a vehicle, and more specifically to a switch for the shift lever assembly.

2. Description of the Prior Art

Vehicles including automatic transmissions use electronic control mechanisms to establish certain operating parameters of the transmission and an ignition of the vehicle. Governmental safety regulations require that a transmission shift lever may only be moved out of a park position if a brake pedal of the vehicle is depressed and a key in the ignition is turned so as to be in a run position. Similarly, governmental regulations require that a key disposed in the ignition may only be removed if the transmission is fully in the park position.

Figure 1:
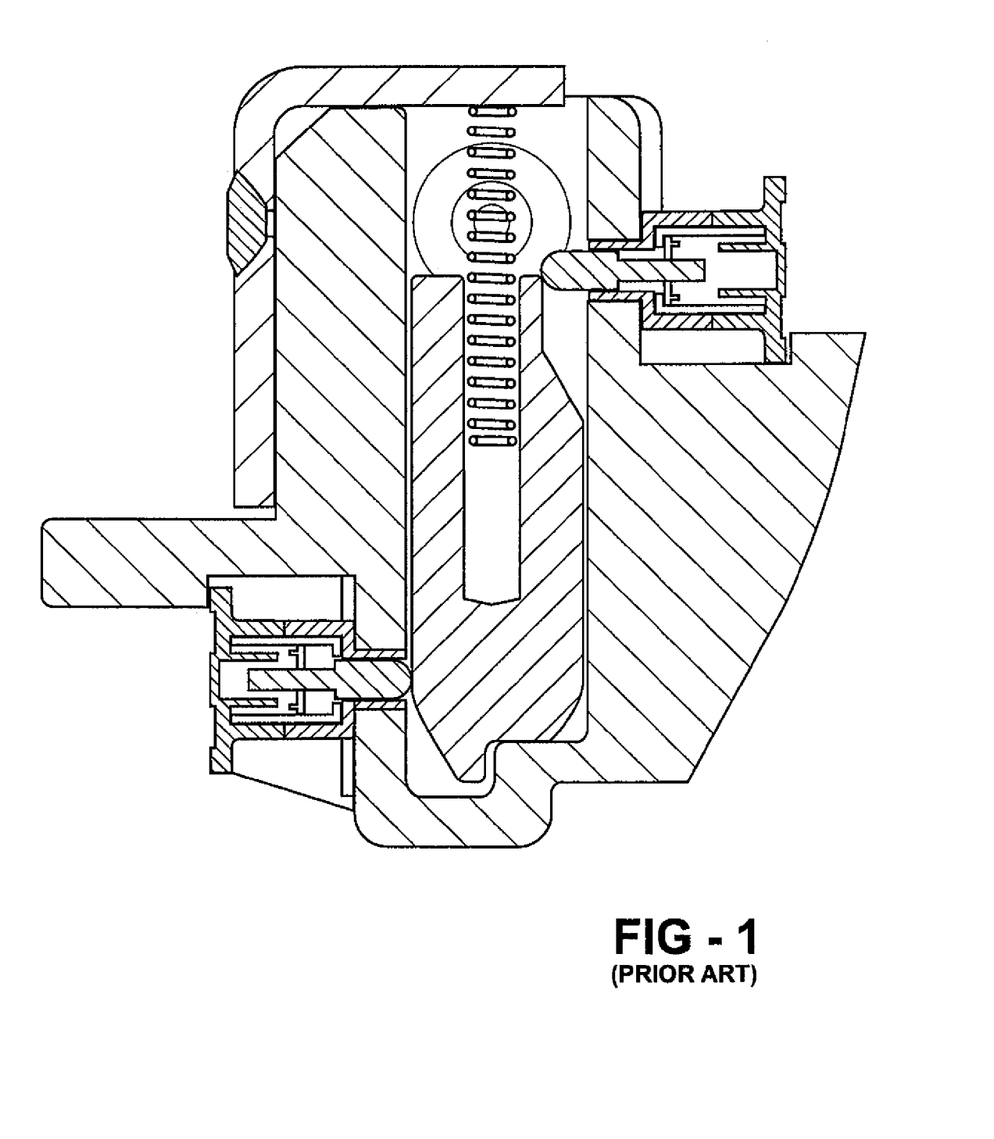
FIG. 1 is a cross section of the prior art shift lever assembly with the shift lever out of the park position.
Figure 2:
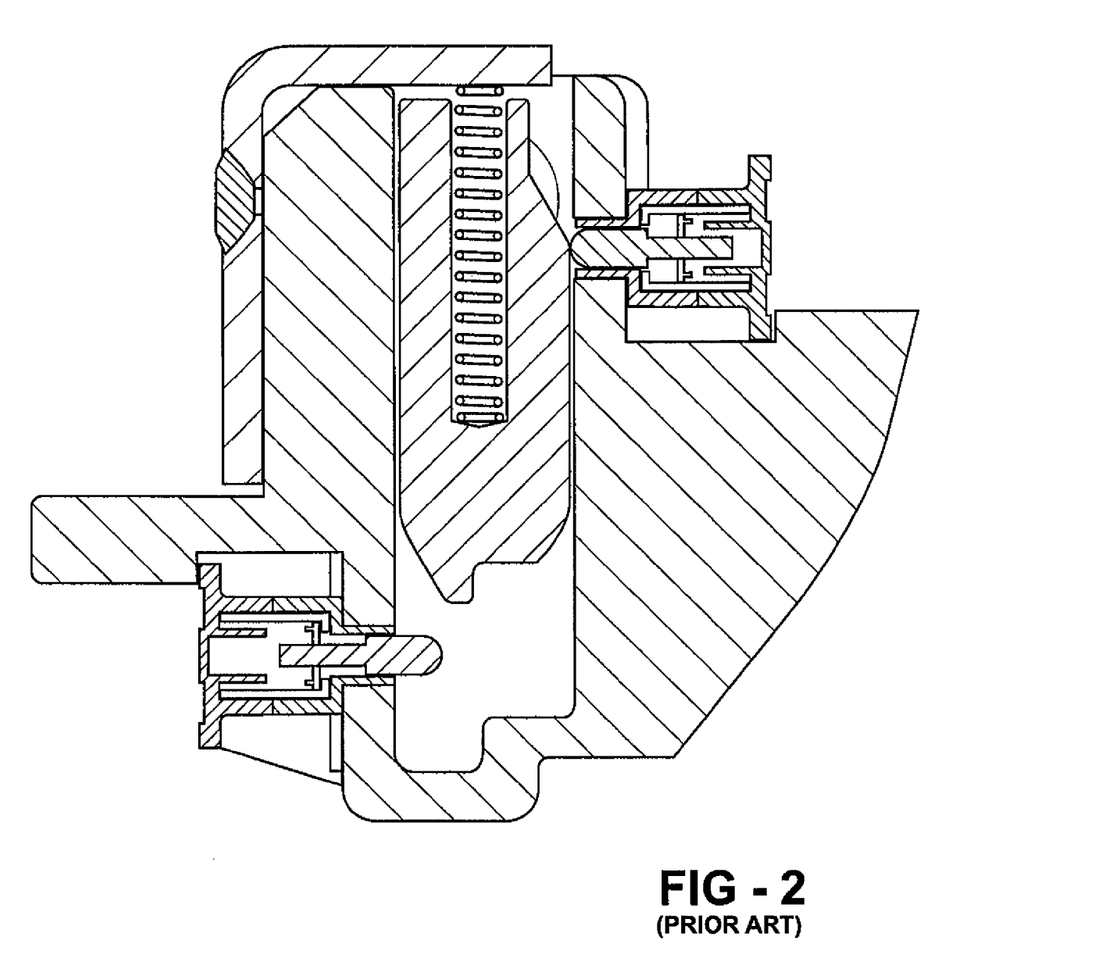
FIG. 2 is a cross section of a prior art shift lever assembly with a shift lever in a park position.

Current shift lever assemblies typically utilize a first switch to detect whether the shift lever of the transmission is in the park position, and a second switch to authorize the removal of the key from the ignition. The shift lever includes an arm moveable with in a slot. Each of the first switch and the second switch include a plunger extendable into the slot. The arm includes a first ramp for engaging the first switch and a second ramp for engaging the second switch. Referring to Prior Art FIG. 1, when the transmission shift lever is not in the park position, the plunger of the first switch is depressed by the arm and the plunger of the second switch is not depressed and is therefore extends into the slot. Referring to Prior Art FIG. 2, as the transmission shift lever is moved into the park position; the plunger of the first switch rides along the ramp into a non-depressed or rest position and extends into the slot, thereby signaling that the transmission shift lever is in the park position. The second ramp engages the plunger of the second switch thereby depressing the plunger and sending a signal authorizing the removal of the key from the ignition. In addition to requiring multiple switches, shift lever assemblies of this type require a significant distance of travel to actuate each of the switches independently and in a properly sequenced order.

SUMMARY OF THE INVENTION AND ADVANTAGES

The subject invention provides a shift lever assembly for a vehicle. The assembly comprises a housing. A shift lever coupled to the housing. The shift lever is rotatable about a first axis. A switch is mounted to the housing. The switch produces a first signal and a second signal. The shift lever is moveable into engagement with the switch in response to rotation of the shift lever about the first axis for actuating the switch. The switch comprises a casing. A plunger extends along a plunger axis and is moveable along the plunger axis relative to the casing. The plunger moves from a rest position when engaged by the shift lever. A first park indication contact is mounted to and moveable with the plunger and a second park indication contact is mounted to the casing to define a first circuit. The first circuit produces the first signal indicating the transmission of the vehicle is in a park position. A first key removal contact is mounted to and moveable with the plunger and a second key removal contact is mounted to the casing to define a second circuit. The second circuit produces the second signal authorizing removal of the key from the ignition. The first park indication contact engages the second park indication contact to close the first circuit when the plunger is in the rest position and is disengaged from the second park indication contact to open the first circuit in response to the plunger moving a first distance along the plunger axis from the rest position. The first key removal contact is disengaged from the second key removal contact to open the second circuit when the plunger is in the rest position and engages the second key removal contact to close the second circuit in response to the plunger moving a second distance along the plunger axis from the rest position. The second distance is greater than the first distance.

Accordingly, the subject invention includes a single switch producing the first signal indicating that the shift lever is in the park position and the second signal authorizing removal of the key. The cost of producing the shift lever assembly is reduced compared to the prior art assemblies because the shift lever assembly of the subject invention only utilizes the single switch, thereby reducing parts and assembly time. Additionally, the single switch shift lever assembly of the subject invention requires less travel distance to actuate the switch than the prior art shift lever assemblies, thereby reducing the space requirements of the shift lever assembly and providing for a more compact shift lever assembly.

BRIEF DESCRIPTION OF THE DRAWINGS

Other advantages of the present invention will be readily appreciated, as the same becomes better understood by reference to the following detailed description when considered in connection with the accompanying drawings wherein.

Prior Art

Prior Art

DETAILED DESCRIPTION OF THE INVENTION

Referring to the Figures, wherein like numerals indicate corresponding parts throughout the several views, a shift lever assembly is shown generally at 20. The shift lever assembly 20 is for a vehicle and actuates an automatic transmission (not shown) of the vehicle. The vehicle further comprises an ignition (not shown) in communication with the shift lever assembly 20. The ignition includes a key that is only removable when the shift lever assembly 20 and the transmission are in a park position. As shown, the shift lever assembly 20 is configured for incorporation into a vehicle having a steering column transmission shift system. However, it should be appreciate that the shift lever assembly 20 may alternatively be configured for incorporation into a vehicle having a center console shift system and still fall within the scope of the subject invention.

Figure 3:
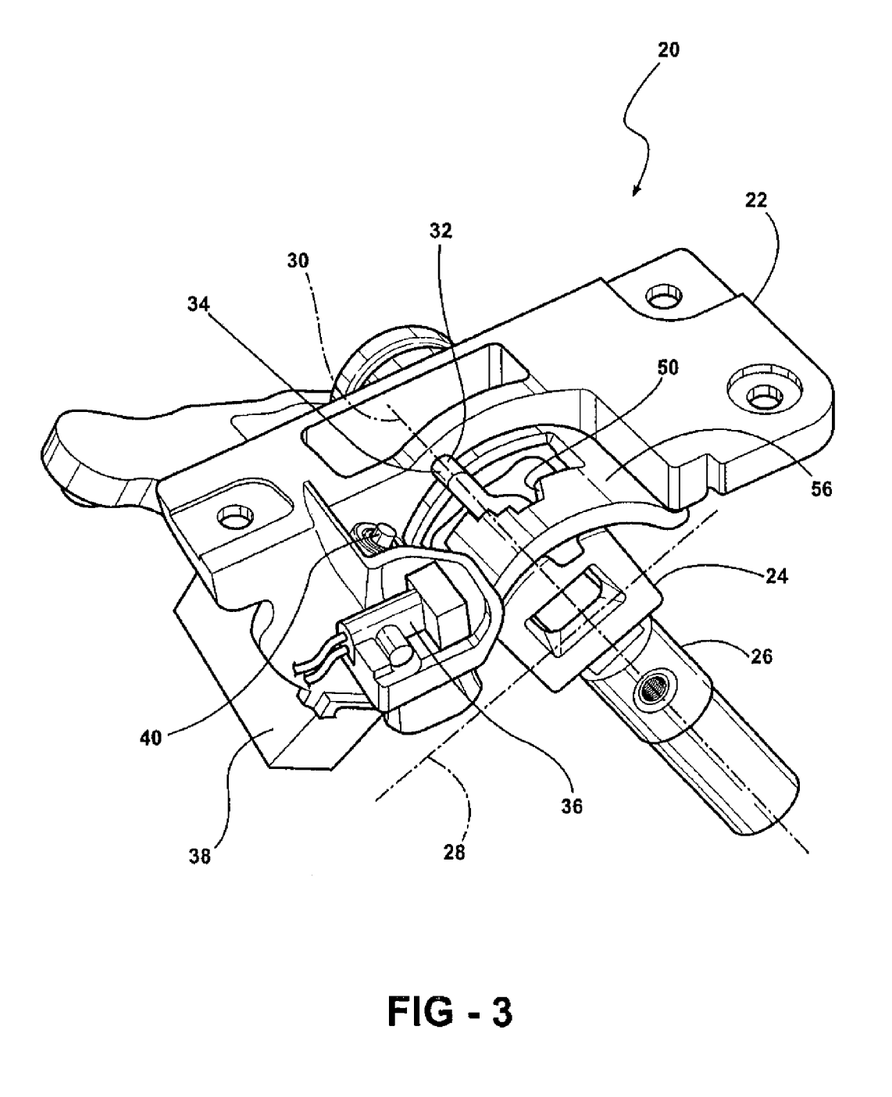
FIG. 3 is a perspective view of the shift lever assembly of the subject invention.
Figure 4:
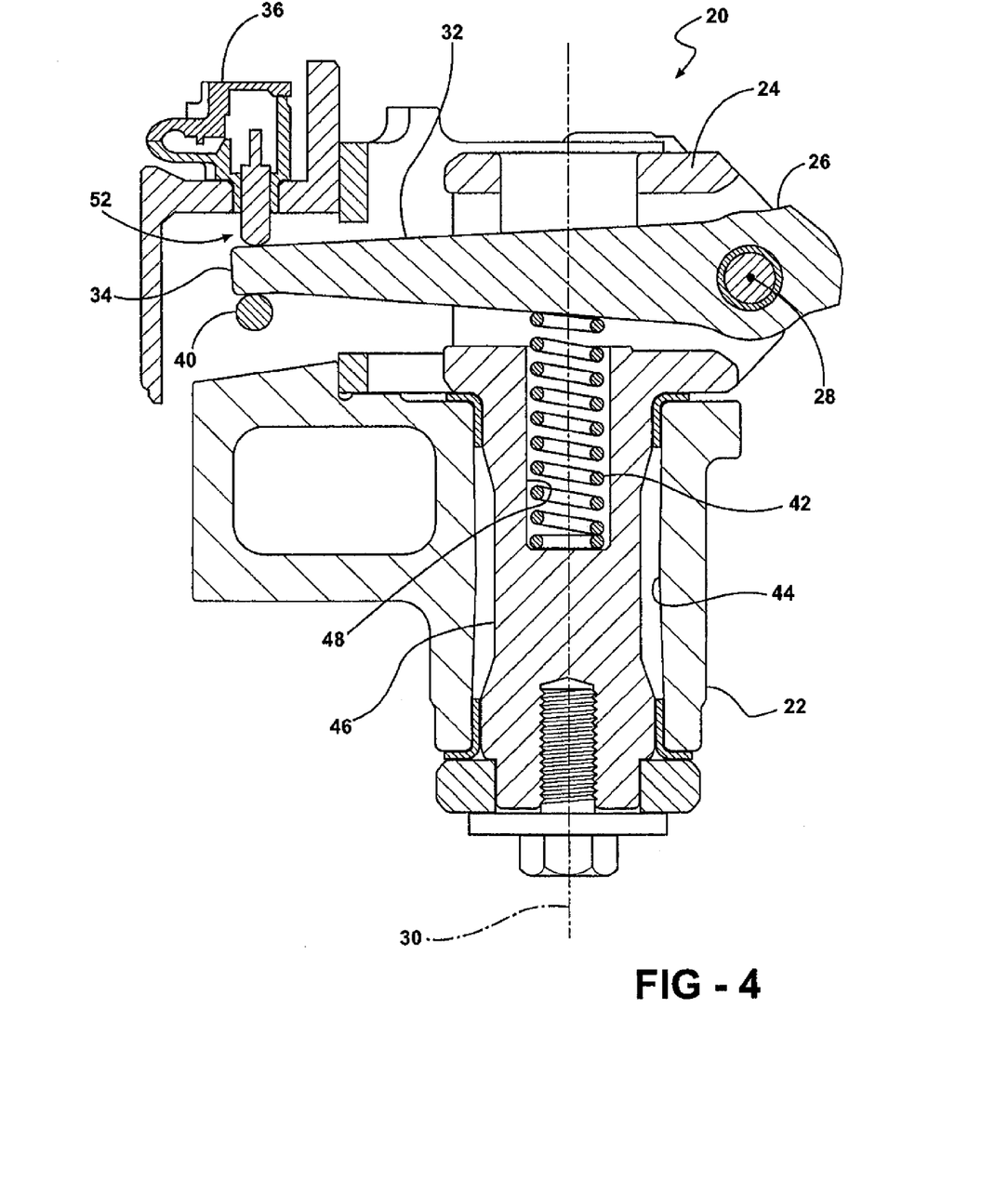
FIG. 4 is a cross section view of the shift lever assembly of the subject invention with a switch of the shift lever assembly in a rest position.
Figure 5:
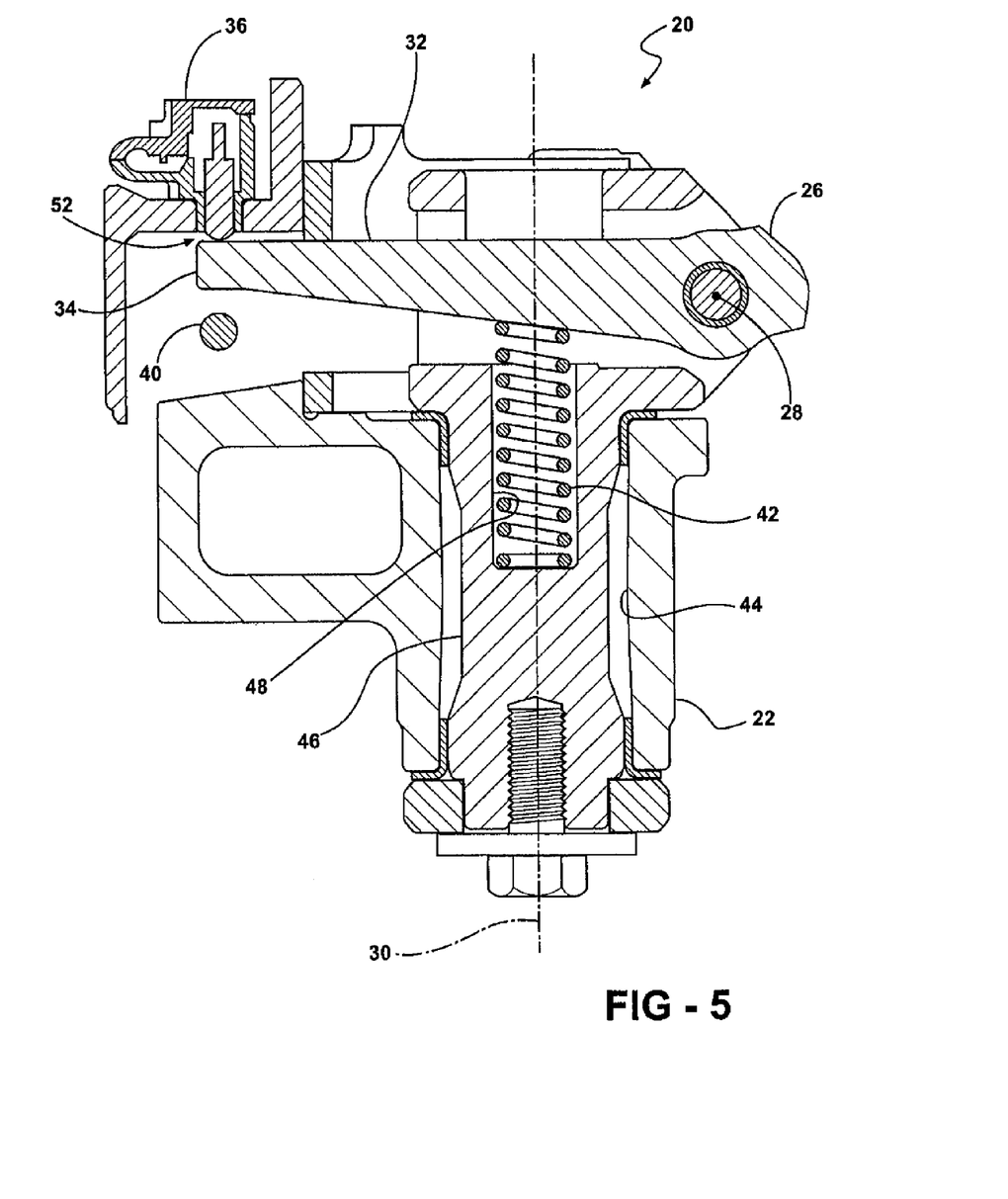
FIG. 5 is a cross section view of the shift lever assembly of the subject invention with the switch of the shift lever assembly in a depressed position.

Referring to FIGS. 3 through 5, the shift lever assembly 20 comprises a housing 22. A bracket 24 is coupled to the housing 22. The bracket 24 interconnects the housing 22 and a shift lever 26, thereby also coupled to the housing 22. The shift lever 26 is rotatable about a first axis 28. The bracket 24 is rotatable with the shift lever 26 about a second axis 30. The second axis 30 is perpendicular to and laterally spaced from the first axis 28.

The shift lever 26 includes an arm 32 extending from the first axis 28 to a distal end 34. The distal end 34 of the arm 32 is disposed opposite the second axis 30 relative to the first axis 28. The distal end 34 is moveable into engagement with a switch 36, described below, in response to rotation of the shift lever 26 about the first axis 28. Accordingly, the distal end 34 of the arm 32 actuates the switch 36.

A Brake Transmission Shift Interlock (BTSI) device is spaced from the switch 36 along the second axis 30. The BTSI device 38 includes a pin 40 that is moveable along the first axis 28 between a retracted position and a raised position. The retracted position permits movement of the distal end 34 of the arm 32 along the second axis 30. The raised position obstructs movement of the distal end 34 of the arm 32 along the second axis 30 in a direction away from the switch 36 when the distal end 34 is engaged with the switch 36. Accordingly, the BTSI device 38 prevents the shift lever 26 from being moved from the park position when the pin 40 of the BTSI device 38 is in the raised position. The BTSI device 38 is coupled to a braking system (not shown) of the vehicle as is well known. The pin 40 is moved into the retracted position in response to activation of the braking system, i.e., by depressing a brake pedal on the vehicle.

A shift lever spring 42 is disposed between the first axis 28 and the distal end 34 of the arm 32. The shift lever spring 42 rotationally biases the arm 32 about the first axis 28 to urge the distal end 34 of the arm 32 into engagement with the switch 36. In other words, the shift lever spring 42 urges the arm 32 of the shift lever 26 to rotate so as to cause the distal end 34 of the arm 32 to engage the switch 36. The shift lever spring 42 preferably includes a coil spring; however, it should be appreciated that the shift lever spring 42 may include some other type of spring.

The housing 22 defines a bore 44, with the bore 44 being concentric with the second axis 30. The shift lever spring 42 is disposed within the bore 44. Preferably, the bracket 24 includes an annular portion 46 disposed within the bore 44, with the annular portion 46 defining a pocket 48 and the shift lever spring 42 being disposed within the pocket 48 of the annular portion 46.

The housing 22 includes a guide surface 50. The guide surface 50 defines a plurality of spaced positions. The spaced positions are axially spaced along the second axis 30, and radially spaced about the second axis 30. The plurality of positions on the guide surface 50 position the arm 32 of the shift lever 26 as the shift lever 26 rotates about the second axis 30. As is well known, each of the plurality of positions corresponds to a different position of the transmission, e.g., a park position, a drive position, a reverse position, a neutral position, etc.

Preferably, the guide surface 50 is disposed along an arc, which is concentric with the second axis 30. However, it should be appreciated that the guide surface 50 need not be disposed along an arc, and may be alternatively disposed, such as along a plane. Preferably, a plate 56 is mounted to the housing 22, with the plate 56 defining the guide surface 50. However, it should be appreciated that the shift lever assembly 20 need not include a separate plate 56 to define the guide surface 50, and that the guide surface 50 may be defined by and integral with the housing 22.

Figure 6:
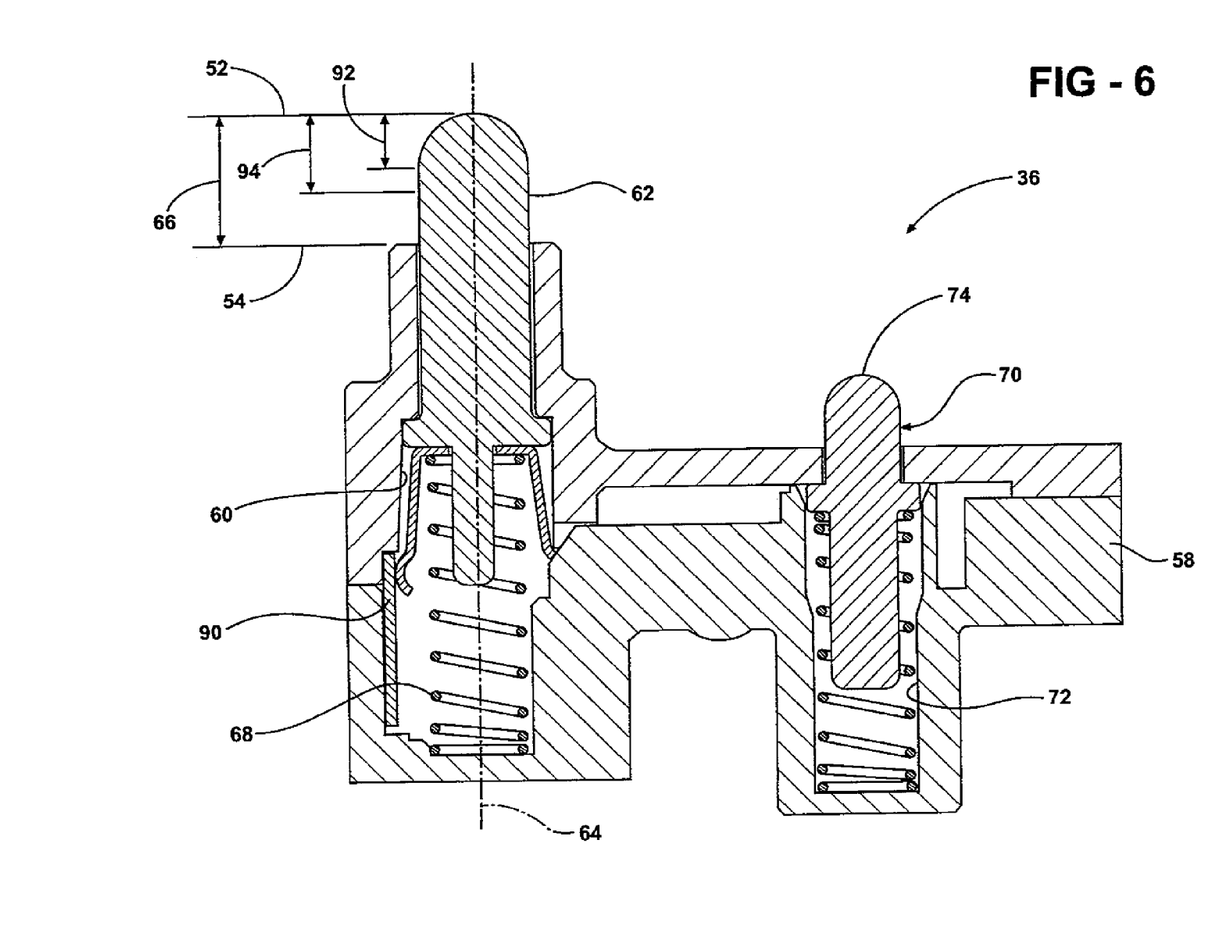
FIG. 6 is a cross section view of the switch.
Figure 7:
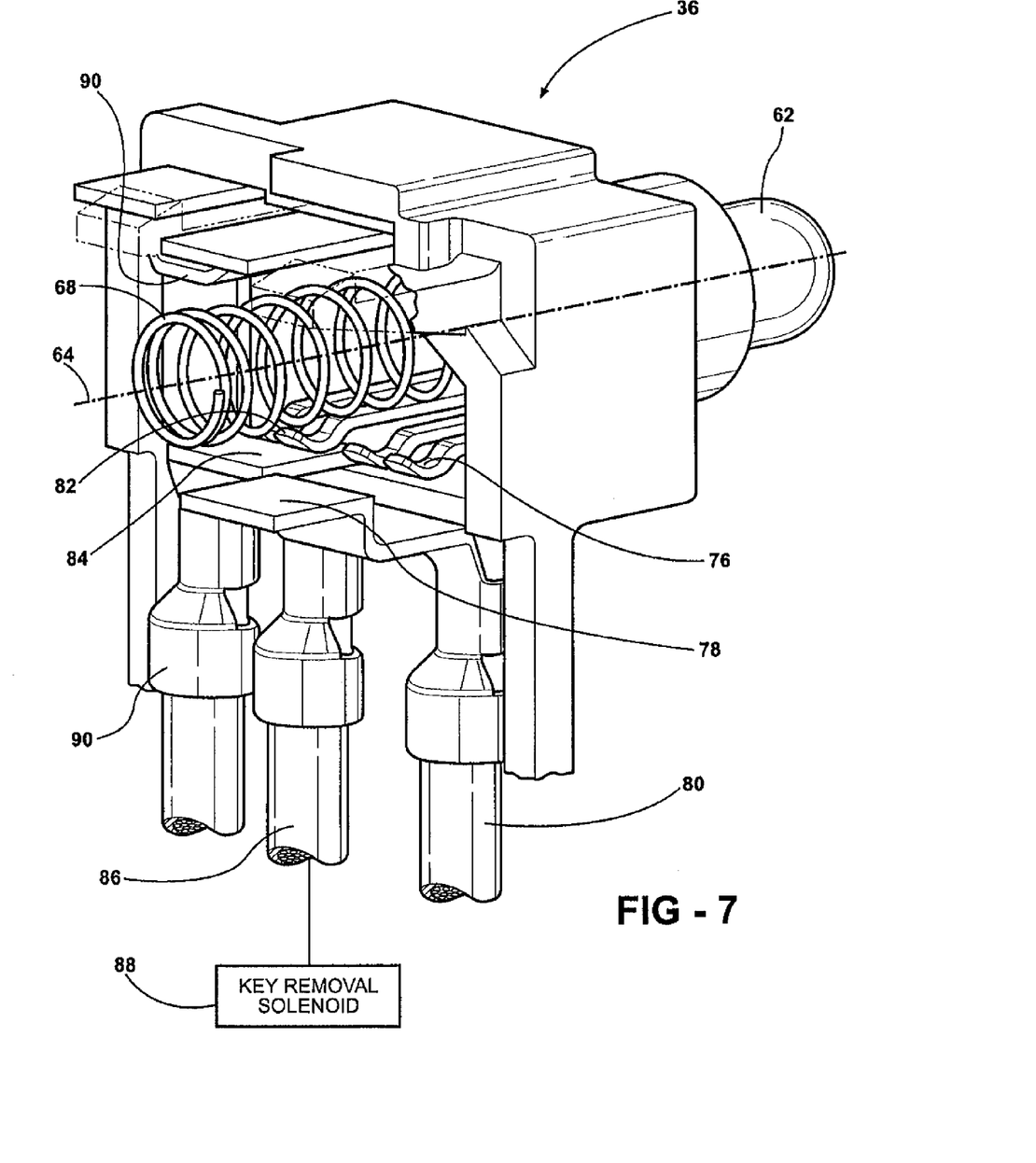
FIG. 7 is a partial fragmentary perspective view of the switch.
Figure 8:
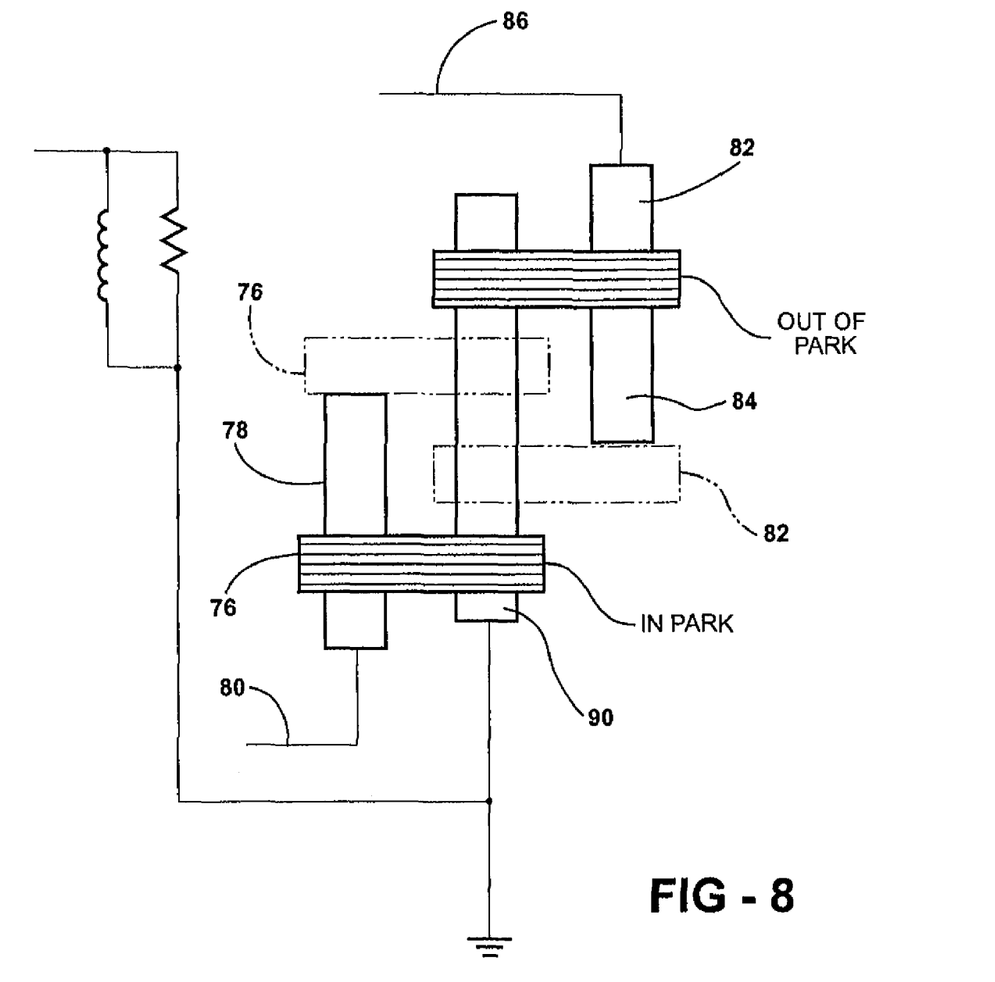
FIG. 8 is a circuit diagram of the switch.

Referring to FIGS. 6 through 8, the switch 36 is mounted to the housing 22. The switch 36 produces a first signal and a second signal. The first signal indicates that the shift lever 26, and thereby the transmission, are in the park position. The second signal authorizes removal of the key from the ignition.

The shift lever 26 is moveable into engagement with the switch 36 in response to rotation of the shift lever 26 about the first axis 28, thereby actuating the switch 36. The switch 36 comprises a casing 58. The casing 58 defines a plunger bore 60, with a plunger 62 slideable disposed within the plunger bore 60. The plunger 62 extends along a plunger axis 64, and is moveable along the plunger axis 64 relative to the casing 58 from a rest position 52 when engaged by the shift lever 26, into a depressed position 54. The plunger bore 60 is concentric with the plunger axis 64. As best shown in FIGS. 4 and 6, the plunger 62 is moveable a full travel distance 66 from the rest position 52 to the depressed position 54. Preferably, the full travel distance 66 is at least 3.50 mm.

A plunger spring 68 is disposed within the plunger bore 60. The plunger spring 68 biases the plunger 62 into the rest position 52. Preferably, the plunger spring 68 is a coil spring. However, it should be appreciated that the plunger spring 68 may include some other spring device not shown or described herein.

The switch 36 includes a detent 70. The detent 70 positions the casing 58 relative to the shift lever assembly 20. As shown, the casing 58 defines a detent bore 72 and the detent 70 includes a head 74 slideably disposed within the detent bore 72. However, it should be appreciated that the detent 70 may include some other device not shown or described herein, such as a clip or the like.

As best shown in FIG. 7 with reference to FIG. 8, the switch 36 includes a first park indication contact 76 and a second park indication contact 78. The first park indication contact 76 is mounted to and moveable with the plunger 62. The second park indication contact 78 is mounted to the casing 58. The first park indication contact 76 and the second park indication contact 78 cooperate together to define a first circuit 80. The first circuit 80 produces the first signal indicating the transmission of the vehicle is in the park position, as described above.

The switch 36 further includes a first key removal contact 82 and a second key removal contact 84. The first key removal contact 82 is mounted to and moveable with the plunger 62. The second key removal contact 84 is mounted to the casing 58. The first key removal contact 82 and the second key removal contact 84 cooperate together to define a second circuit 86. The second circuit 86 produces the second signal authorizing removal of the key from the ignition, as described above. The second circuit 86 may includes a key removal solenoid 88 coupled to the second key removal contact 84. The key removal solenoid 88 actuates an inhibitor (not shown) to permit removal of the key as is well known.

The switch 36 further includes a ground contact 90. The ground contact 90 is mounted to the casing 58, and is coupled to and in contact with the first park indication contact 76 and the first key removal contact 82.

When the plunger 62 is in the rest position 52, the first park indication contact 76 is engaged with the second park indication contact 78 to thereby close, i.e. turn on, the first circuit 80. In response to the plunger 62 moving a first distance 92 along the plunger axis 64 from the rest position 52, the first park indication contact 76 is disengaged from the second park indication contact 78 to thereby open, i.e., turn off, the first circuit 80.

When the plunger 62 is in the rest position 52, the first key removal contact 82 is disengaged from the second key removal contact 84 to thereby open, i.e., turn off, the second circuit 86. In response to the plunger 62 moving a second distance 94 along the plunger axis 64 from the rest position 52, the first key removal contact 82 engages the second key removal contact 84 to thereby close, i.e., turn on, the second circuit 86.

One of the first key removal contact 82 and the second key removal contact 84 is axially spaced along the plunger axis 64 from one of the first park indication contact 76 and the second park indication contact 78. Accordingly, the second distance 94 is greater than the first distance 92. As shown, the first park indication contact 76 and the first key removal contact 82 are evenly spaced relative to each other along the plunger axis 64. The second park indication contact 78 is spaced farther along the plunger axis 64 than the second key removal contact 84 relative to the first park indication contact 76 and the first key removal contact 82. Accordingly, the second park indication contact 78 is nearer the depressed position 54 of the plunger 62 than the second key removal contact 84, and the second key removal contact 84 is nearer the rest position 52 of the plunger 62 than the second park indication contact 78. However, it should be appreciated that the relative positions of the second park indication contact 78 and the second key removal contact 84 with respect to the first park indication contact 76 and the first key removal contact 82 may be reversed, i.e., may be the mirror image of that described above. Accordingly, the mirror image includes the second park indication contact 78 and the second key removal contact 84 may be evenly spaced along the plunger axis 64 relative to each other, with the first park indication contact 76 and the first key removal contact 82 being axially spaced from each other along the plunger axis 64.

Preferably, the first distance 92 is between the range of 0.00 mm and 1.60 mm. More preferably, the first distance 92 is at least 1.10 mm. Preferably, the second distance 94 is between the range of 0.00 mm and 2.30 mm. More preferably, the second distance 94 is at least 1.60 mm, and even more preferably, the second distance 94 is at least 1.70 mm. Accordingly, because the second distance 94 is greater than the first distance 92, it should be appreciated that the first circuit 80 must close, i.e., turn on prior to the second circuit 86 opening, i.e., turn off. As such, the first circuit 80 must indicate that the shift lever 26 is in the park position before the second circuit 86 may authorize removal of the key from the ignition.

The invention has been described in an illustrative manner, and it is to be understood that the terminology which has been used is intended to be in the nature of words of description rather than of limitation. As is now apparent to those skilled in the art, many modifications and variations of the present invention are possible in light of the above teachings. It is, therefore, to be understood that within the scope of the appended claims, wherein reference numerals are merely for convenience and are not to be in any way limiting, the invention may be practiced otherwise than as specifically described.

What is claimed is:

1. A shift lever assembly for a vehicle, said assembly comprising:
    a housing;
    a shift lever coupled to said housing and rotatable about a first axis; and
    a switch mounted to said housing for producing a first signal and a second signal;
    said shift lever moveable into engagement with said switch in response to rotation of said shift lever about said first axis for actuating said switch;
    wherein said switch comprises:
    a casing;
    a plunger extending along a plunger axis and moveable along said plunger axis relative to said casing from a rest position when engaged by said shift lever;
    a first park indication contact mounted to and moveable with said plunger and a second park indication contact mounted to said casing to define a first circuit for producing a first signal indicating the transmission of the vehicle is in a park position;
    a first key removal contact mounted to and moveable with said plunger and a second key removal contact mounted to said casing to define a second circuit for producing a second signal authorizing removal of the key from the ignition;
    said first park indication contact engaging said second park indication contact to close said first circuit when said plunger is in said rest position and disengaging said second park indication contact to open said first circuit in response to said plunger moving a first distance along said plunger axis from said rest position and said first key removal contact disengaged from said second key removal contact to open said second circuit when said plunger is in said rest position and engaging said second key removal contact to close said second circuit in response to said plunger moving a second distance along said plunger axis from said rest position with said second distance being greater than said first distance.

2. An assembly as set forth in claim 1 further comprising a bracket coupled to said housing and interconnecting said housing and said shift lever and rotatable with said shift lever about a second axis perpendicular to and laterally spaced from said first axis.

3. An assembly as set forth in claim 2 wherein said shift lever includes an arm extending from said first axis to a distal end opposite said second axis relative to said first axis with said distal end moveable into engagement with said switch in response to rotation of said shift lever about said first axis for actuating said switch.

4. An assembly as set forth in claim 3 further comprising a brake transmission shift interlock device spaced from said switch along said second axis and moveable along said first axis between a retracted position permitting movement of said distal end of said arm along said second axis and a raised position obstructing movement of said distal end of said arm along said second axis away from said switch when said distal end is engaged with said switch.

5. An assembly as set forth in claim 4 further comprising a shift lever spring disposed between said first axis and said distal end of said arm for rotationally biasing said arm about said first axis to urge said distal end of said arm into engagement with said switch.

6. An assembly as set forth in claim 5 wherein said housing defines a bore concentric with said second axis with said shift lever spring disposed within said bore.

7. An assembly as set forth in claim 3 wherein said housing includes a guide surface defining a plurality of axially spaced positions along said second axis radially spaced about said second axis for positioning said arm of said shift lever as said shift lever rotates about said second axis.

8. A switch for a shift lever assembly of a vehicle for actuating a transmission of the vehicle and responsive to the presence of a key within an ignition of the vehicle, said switch comprising:
    a casing;
    a plunger extending along a plunger axis and moveable along said plunger axis relative to said casing from a rest position;

a first park indication contact mounted to and moveable with said plunger and a second park indication contact mounted to said casing to define a first circuit for producing a first signal indicating the transmission of the vehicle is in a park position;

a first key removal contact mounted to and moveable with said plunger and a second key removal contact mounted to said casing to define a second circuit for producing a second signal authorizing removal of the key from the ignition;

said first park indication contact engaging said second park indication contact to close said first circuit when said plunger is in said rest position and disengaging said second park indication contact to open said first circuit in response to said plunger moving a first distance along said plunger axis from said rest position and said first key removal contact disengaged from said second key removal contact to open said second circuit when said plunger is in said rest position and engaging said second key removal contact to close said second circuit in response to said plunger moving a second distance along said plunger axis from said rest position with said second distance being greater than said first distance.

9. A switch as set forth in claim 8 wherein one of said first key removal contact and said second key removal contact is axially spaced along said plunger axis from one of said first park indication contact and said second park indication contact.

10. A switch as set forth in claim 9 wherein said first distance is between the range of 0.00 mm and 1.60 mm.

11. A switch as set forth in claim 10 wherein said first distance is at least 1.10 mm.

12. A switch as set forth in claim 10 wherein said second distance is between the range of 0.00 mm and 2.30 mm.

13. A switch as set forth in claim 12 wherein said second distance is at least 1.60 mm.

14. A switch as set forth in claim 13 wherein said second distance is at least 1.70 mm.

15. A switch as set forth in claim 12 wherein said plunger is moveable a full travel distance from said rest position to a depressed position.

16. A switch as set forth in claim 15 wherein said full travel distance is at least 3.50 mm.

17. A switch as set forth in claim 12 further comprising a ground coupled to said first park indication contact and said first key removal contact.

18. A switch as set forth in claim 17 wherein said second circuit includes a key removal solenoid coupled to said second key removal contact.

19. A switch as set forth in claim 9 wherein said casing defines a plunger bore concentric with said plunger axis with said plunger slideably disposed within said plunger bore.

20. A switch as set forth in claim 19 further comprising a plunger spring disposed within said plunger bore and biasing said plunger into said rest position.

21. A switch as set forth in claim 20 further comprising a detent for positioning said casing relative to the shift lever assembly.

* * * * *